US008709221B1

(12) United States Patent
Smith

(10) Patent No.: US 8,709,221 B1
(45) Date of Patent: Apr. 29, 2014

(54) CURRENT REGULATOR FOR MOBILE WATER ELECTROLYZER

(76) Inventor: Andrew L. Smith, Cape Coral, FL (US)

( * ) Notice: Subject to any disclaimer, the term of this patent is extended or adjusted under 35 U.S.C. 154(b) by 271 days.

(21) Appl. No.: 13/034,485

(22) Filed: Feb. 24, 2011

Related U.S. Application Data

(60) Provisional application No. 61/307,756, filed on Feb. 24, 2010.

(51) Int. Cl.
*C25B 1/00* (2006.01)
*C25B 1/04* (2006.01)
*C25B 9/04* (2006.01)
*C25B 15/02* (2006.01)

(52) U.S. Cl.
CPC . *C25B 15/02* (2013.01); *C25B 1/00* (2013.01); *C25B 1/04* (2013.01); *C25B 9/04* (2013.01)
USPC ........ 204/278; 204/230.2; 205/628; 205/633; 205/637

(58) Field of Classification Search
None
See application file for complete search history.

(56) References Cited

U.S. PATENT DOCUMENTS

| | | | |
|---|---|---|---|
| 4,107,008 A * | 8/1978 | Horvath | ........................ 205/339 |
| 4,389,981 A | 6/1983 | Meyer | |
| 4,613,304 A | 9/1986 | Meyer | |
| 4,798,661 A | 1/1989 | Meyer | |
| 4,822,469 A * | 4/1989 | Shimomura et al. | ........ 204/228.5 |
| 4,936,961 A | 6/1990 | Meyer | |
| 5,037,518 A * | 8/1991 | Young et al. | ............... 204/228.5 |
| 5,149,407 A | 9/1992 | Meyer | |
| 5,178,119 A | 1/1993 | Gale | |
| 5,183,011 A | 2/1993 | Fujii | |
| 5,231,954 A | 8/1993 | Stowe | |
| 5,293,857 A | 3/1994 | Meyer | |
| 6,740,436 B2 | 5/2004 | Chou et al. | |
| 6,977,120 B2 | 12/2005 | Chou et al. | |
| 2006/0210843 A1 * | 9/2006 | Masse et al. | ..................... 429/13 |
| 2006/0291822 A1 * | 12/2006 | Sheldon | ........................ 392/312 |
| 2007/0202371 A1 * | 8/2007 | Takeda et al. | .................... 429/23 |
| 2008/0257751 A1 * | 10/2008 | Smola et al. | .................. 205/628 |
| 2008/0296173 A1 * | 12/2008 | Mishra et al. | ................. 205/742 |

* cited by examiner

*Primary Examiner* — James Lin
*Assistant Examiner* — Ho-Sung Chung
(74) *Attorney, Agent, or Firm* — Andrews Kurth LLP; Aldo Noto; Matthew J. Esserman

(57) ABSTRACT

An embodiment of a system and method provides a current regulating device that controls or regulates the current provided to electrolysis chambers that produce hydrogen and oxygen gases. One embodiment of the current regulating device uses the temperature of the fluid in the electrolysis chambers to control the widths of the pulses delivered to the electrolysis chambers to regulate production. Another embodiment of the current regulating device regulates and limits the average current delivered to the electrolysis chambers by adjusting the pulse widths, according to the current demanded during each conduction pulse.

18 Claims, 4 Drawing Sheets

CURRENT REGULATOR FOR MOBILE WATER ELECTROLYZER

RELATED APPLICATIONS

This application claims the priority of U.S. Provisional Application Ser. No. 61/307,756, entitled "CURRENT REGULATOR FOR MOBILE WATER ELECTROLYZER" and filed Feb. 24, 2010, which is hereby incorporated by reference in its entirety.

TECHNICAL FIELD

The technical field relates to the field of hydrogen gas devices that electrolyze water. It includes such devices that inject the resulting hydrogen and oxygen gas into a motor vehicle's engine intake. More particularly, this relates to a regulator for an electrolyzer or electrolysis chamber that can be used as part of a mobile hydrogen gas device.

BACKGROUND

Hydrogen is an efficient abundant and generally non-polluting energy source. However, there are difficulties in using hydrogen in motor vehicles powered by internal combustion engines. One difficulty or concern in such hydrogen applications is safety. Various safety problems may be encountered during implementation. For example, since hydrogen gas is highly volatile and rapidly disperses, safe piping or transmission of the gas can be difficult. Storage of large quantities of hydrogen gas can also be dangerous. On-site or mobile production of hydrogen gas can eliminate some of these problems.

Devices that electrolyze water and inject the resulting hydrogen and oxygen into a vehicle's intake have been touted as a means for saving gasoline. These devices have been promoted with claims of increasing gas mileage, torque, and the benefits of decreased emissions.

These devices are sometimes referred to as hydrogen generators, hydrogen boosters or HHO devices. The technology of these hydrogen production devices is based upon simple electrolysis of water, splitting the hydrogen from the oxygen. The fuel generator (also known as the electrolyzer, electrolysis chamber or fuel cell) breaks water molecules into hydrogen and oxygen gases, as well as other gasses from material formerly dissolved in the water. This is not new technology. Simple hydrogen gas devices have been around for years, most notably Stan Meyers had a device in the early 1980's which he demonstrated by running a dune buggy on nothing but water using an internal combustion engine. Mr. Meyers has a series of patents including U.S. Pat. No. 5,293,857 "Hydrogen Gas Fuel and Management System for an Internal Combustion Engine Utilizing Hydrogen Gas Fuel," U.S. Pat. No. 5,149,407 "Process and Apparatus for the Production of Fuel Gas and The Enhanced Release of Thermal Energy from Such Gas," U.S. Pat. No. 4,936,961 "Method for the Production of a Fuel Gas," U.S. Pat. No. 4,613,304 Gas Electrical Hydrogen Generator," U.S. Pat. No. 4,389,981 Hydrogen Gas Injector System For Internal Combustion Engine," as well as U.S. Pat. No. 4,798,661 "Gas Generator Voltage Control Circuit" which is hereby incorporated by reference herein.

Driven by the rise in gasoline prices since 2005, a number of products have been introduced to the market that claim to successfully use hydrogen to save gasoline. There are also a number of websites that describe or compare the various available devices. One such website is ho-gas.org. In addition, there are a number of "how-to" books advertised for sale that describe building a mobile hydrogen gas production device.

There is a need to control or regulate the current provided to electrolysis chambers producing hydrogen and oxygen gases.

SUMMARY

An embodiment of a system is disclosed for controlling the production of gas by a water electrolysis chamber using a power source. The system includes an array of solid state power switches operably connected to the water electrolysis chamber. Current is turned on and off by the array of solid state power switches. The system further includes an electronic system connected to the array of solid state power switches. Current provided to the water electrolysis chamber is provided through the array of solid state power switches and is limited to a desired or peak average current by the electronic system.

Another embodiment of a system is disclosed for controlling the production of gas by a water electrolysis chamber using a power source. The system includes a switch array operably connected to the water electrolysis chamber and an electronic system connected to the switch array including a sample/hold (S/H) circuit, a ramp generator, an offset adjustor and a voltage comparator. Current provided to the water electrolysis chamber is provided through the switch array and is limited to a desired or peak average current by the electronic system.

An embodiment of a method is disclosed for regulating a water electrolysis chamber for use in a system for producing hydrogen and/or other gases to be burned in an internal combustion engine. The method includes receiving power from a power source, holding a switch array in a conduction state so that direct current originating from the power source is provided to the water electrolysis chamber, detecting when a desired or peak average current is reached, modulating current, using the switch array, with cut-off pulses to maintain the desired or peak average current, and opening the switch array to stop current flow to the water electrolysis chamber if a peak current is greater than twice the desired or peak average current.

Yet another embodiment of a system is disclosed for controlling the production of gas by a water electrolysis chamber using a power source. The system includes an array of solid state power switches operably connected to the water electrolysis chamber. Current is turned on and off by the array of solid state power switches. The system further includes a monitoring resistor connected to the array of solid state power switches, a Vcc regulator connected to the monitoring resistor and the array of solid state power switches, a fixed gain current amplifier connected to the monitoring resistor, and an electronic system connected to the array of solid state power switches and the fixed gain current amplifier. The electronic system includes an engine run detector, a ramp generator, a scale adjustment resistor, a sample/hold (S/H) circuit, an offset adjustor, and a voltage comparator. Current provided to the water electrolysis chamber is provided through the array of solid state power switches and is limited to a desired or peak average current by the electronic system.

DESCRIPTION OF THE DRAWINGS

The detailed description will refer to the following drawings, wherein like numerals refer to like elements, and wherein.

DETAILED DESCRIPTION

Figure 1:
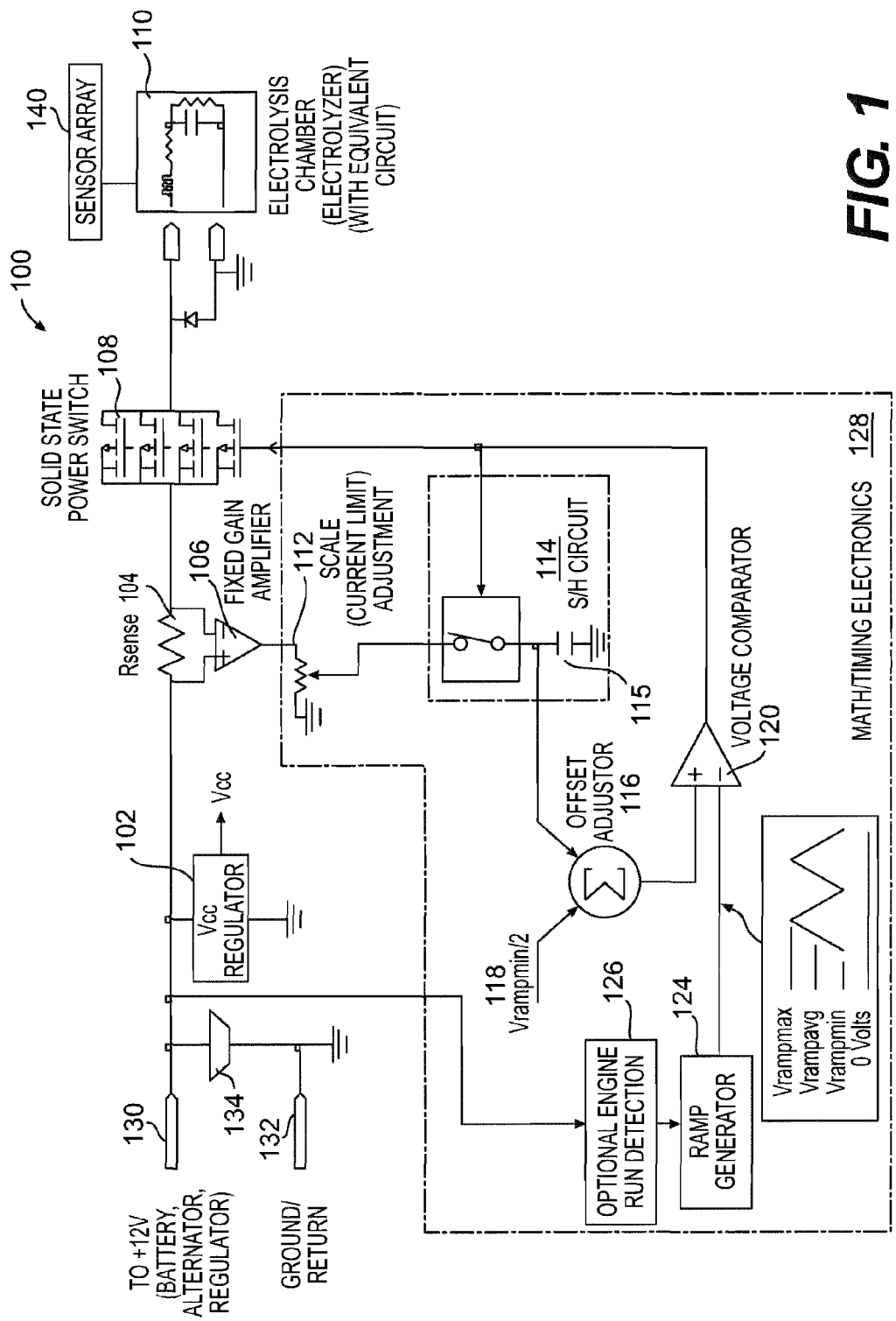
FIG. 1 illustrates an exemplary circuit of an embodiment of a current regulating device that controls or regulates the current provided to electrolysis chambers that produce hydrogen and oxygen gases.

An embodiment of a system and method provides a current regulating device that controls or regulates the current provided to electrolysis chambers that produce hydrogen and oxygen gases. One embodiment of the current regulating device uses the temperature of the fluid in the electrolysis chambers to control the widths of the electric pulses delivered to the electrolysis chambers to regulate production. Another embodiment of the current regulating device regulates and limits the average current delivered to the electrolysis chambers by adjusting the pulse widths, according to the current demanded during each conduction pulse.

To effectively electrolyze water to its hydrogen and oxygen components, it is beneficial to regularly clear the electrolyzing sites on the electrodes of hydrogen and oxygen gas during electrolysis in order to sustain maximum contact of the electrolyzing sites with water molecules. One cost effective method of accomplishing this is to apply pulsed current to the electrodes, allowing the gas molecules to rise and separate away from the electrolyzing sites between current pulses. Using pulsed current, it is possible to generate hydrogen and oxygen in Liters per Minute production volumes from small chambers, as may be valuable in mobile gas production applications. Furthermore, varying energy delivery pulse widths allows for the adjustment of delivered power at high electrical conversion efficiencies.

However, as the electrolysis process progresses, the conductivity of the electrolysis chamber increases, demanding more current and more power, at any fixed pulse width. As the conductivity increases, so does the production of gas. The increase in gas production can compromise the safe regulation of the production of gas. Furthermore, as conductivity and production increase the temperature of the water begins to rise. Allowing the temperature to rise to the point that the water boils causes the gas generated to be mixed with large amounts of water vapor which compromises the purity of the hydrogen and oxygen gas produced.

One method of preventing this thermal runaway condition is to monitor the temperature of the electrolysis chamber. In one embodiment, the temperature of the fluid in the electrolysis chamber is used to control the widths of the pulses delivered to the electrolysis chamber and thus regulate production. To regulate, as the temperature increases pulse widths are narrowed before being delivered to the electrolysis chamber, thereby delivering less power. In some embodiments this temperature control may work to regulate the electrolysis. However, the effectiveness of this method is vulnerable to variations in environmental temperatures, particularly when in outdoor and mobile applications, and may be insufficient in certain systems as the only control method. Furthermore, this method does not necessarily adjust output power should the input voltage increase (or decrease), as might happen when an alternator begins to operate or when the battery load increases, such as when the alternating current (A/C) is turned on.

Another method is to regulate and limit the average current delivered to the electrolysis chamber by adjusting the pulse widths, according to the current demanded during each conduction pulse. Furthermore, the energy delivered to the electrolysis chamber can be reduced rather than merely regulated to a fixed value, further forcing the temperature down as conduction increases (negative regulation). As illustrated in FIG. 1, an embodiment of this method uses a low cost, simple device and simple mathematical operations.

Despite the benefits of pulse modulation and pulse width modulation, it is also worthy to note that during the initial, cool chamber state, it is possible to apply full power to promote electrolysis, without pulses at all. This full power start-up allows for a quicker and greater production of gas. Using a greater amount of gas for a cold internal combustion engine start can also help reduce emission of pollutants from the engine. The embodiments and exemplary circuit shown in FIG. 1 allow for full power during a cool chamber start-up.

FIG. 1 illustrates an exemplary circuit 100 of an embodiment of a current regulating device that controls or regulates the current provided to electrolysis chambers that produce hydrogen and oxygen gases. The circuit 100 may be connected to an electrolysis chamber 110 in which the gases are produced. The circuit 100 may be connected to a power supply 130, such as a 12 V battery, alternator, or alternator and regulator, as well as ground 132. A capacitor 134 may be connected between the power supply 130 and ground 132 to hold a local supply of charge. Other power sources may be used to power the circuit 100 and the electrolysis chamber 110, including re-generated solar or green power. Depending upon the application, different voltage levels may be used as input.

The circuit 100 includes a Vcc regulator 102, a monitoring resistor Rsense 104, a fixed gain current amplifier 106, and a bank of solid state power switches 108 (i.e., array of solid state power switches or switch array). The Vcc regulator 102 may be connected to the power supply 130 directly. Alternatively, the Vcc regulator 102 may be connected before the capacitor 134 using, for example, another battery, source, supply, intermediary regulator, or other pre-regulator filter. The capacitor 134 holds a local supply of charge to be delivered by the bank of solid state power switches 108 to the electrolysis chamber 110 without the wiring inductance to the power supply 130 causing voltage spikes (both high voltage and low voltage) that could interfere with the Vcc regulator 102. The bank of solid state power switches 108 can be a semiconductor switch, such as a Metal Oxide Semiconductor Field Effect Transistors (MOSFET) switch or other type of switch. The circuit 100 may include an electronic system, also referred to as math/timing electronics 128, which is delineated with a dotted line. The math/timing electronics 128 may include an engine run detector 126, a ramp generator 124, a scale (current limit) adjustment resistor 112, a sample/hold (S/H) circuit 114, an offset adjustor 116, and a voltage comparator 120.

In operation, an S/H capacitor 115 in the S/H circuit 114 is not yet charged initially. Without engine detection, or with an internal combustion engine detected as on, the offset adjustor 116 and the ramp generator 124 generate an offset triangle/ramp signal that forces the voltage comparator 120 to generate a low output voltage that in turn holds the bank of solid state power switches 108 in the conduction state and holds the S/H circuit 114 in the sample state. The circuit 100 remains in this state, allowing uninterrupted direct current (DC) to flow to the electrolysis chamber 110, until the fixed gain current amplifier 106 in combination with the scale adjustment resistor 112 generates a voltage on the S/H capacitor 115 which, when shifted by the amount of Vrampmin divided by two (2) 118, is greater than the minimum ramp voltage. At this point, the current delivered to the electrolysis chamber 110 may be a desired current level, for example, peak average current. When this desired or peak average current is met, either due to increased conductivity of the electrolysis chamber 110 or an increase in supply voltage, or both, the voltage comparator 120 begins to modulate the current with cut-off pulses. The cut-off pulses may widen as the capacitor voltage increases. When the voltage comparator output swings positive and the capacitor voltage is high enough, the bank of solid state power switches 108 opens, turning off current flow to the electrolysis chamber 110. Also, the S/H circuit 114 changes state to hold the sampled value for the next generated ramp cycle. The proportion by which the current flow is stopped may affect the average current delivered to the electrolysis chamber 110.

With the ramp proportionally and symmetrically generated so that its average value is twice its minimum value (which may, for example, be accomplished using a resistor-divider type triangle wave generator), the current detected may be twice the maximum current (i.e., peak current) allowed before modulation begins. At this point, the ramp generator 124 may modulate the current to 50% of the peak current. Effectively, this cuts a 2× PeakAverage current back down by 50%, restoring it to a value of 50%×2× PeakAverage=PeakAverage current. However, should the peak current exceed 2×, the triangle wave will continue to decrease the resulting current even to the point of shutting down the current completely. This happens when the peak current's voltage result (at the voltage comparator's +input) is greater than the maximum ramp voltage. The resulting high output voltage from the voltage comparator 120 may keep the current to the electrolysis chamber 110 off until the S/H capacitor 115 self-discharges, which may take several minutes. As a result, the circuit 110 absolutely cools and regulates the power to the electrolysis chamber 110. A high-value resistor (not shown) may optionally be placed in parallel with the S/H capacitor 115 to minimize the time-out duration to a preferred length of time. Other methods and calculations may be used to cool-off or turn-off current to the electrolysis chamber 110.

The electrolysis chamber 110 may be connected to a sensor array 140 that detects, for example, electrolysis chamber pressure, electrolysis chamber temperature, and gas output or generation.

The operations and adjustments in math/timing electronics 128 can be performed by a microcontroller (not shown) that reads the current demanded during pulses and controls the bank of solid state power switches 108 accordingly. Gas production can be seized or stopped when the line voltage is below a threshold level, indicating that the internal combustion engine is not running. The threshold level may be an initial level detected immediately as power is applied by the ignition key, but before the internal combustion engine starts. The threshold level may also be a fixed value, adjusted after installation, as voltages will vary according to the electrical distance from the source of power, battery, alternator, and/or regulator. Other methods may be used to detect that the internal combustion engine or other device using the produced gas is not operating.

In testing, an embodiment of the system and method is found to work well for the regular generation of hydrogen and oxygen from water. An embodiment including an electrolysis chamber 110 is found to work in combination with an internal combustion engine.

Figure 2:
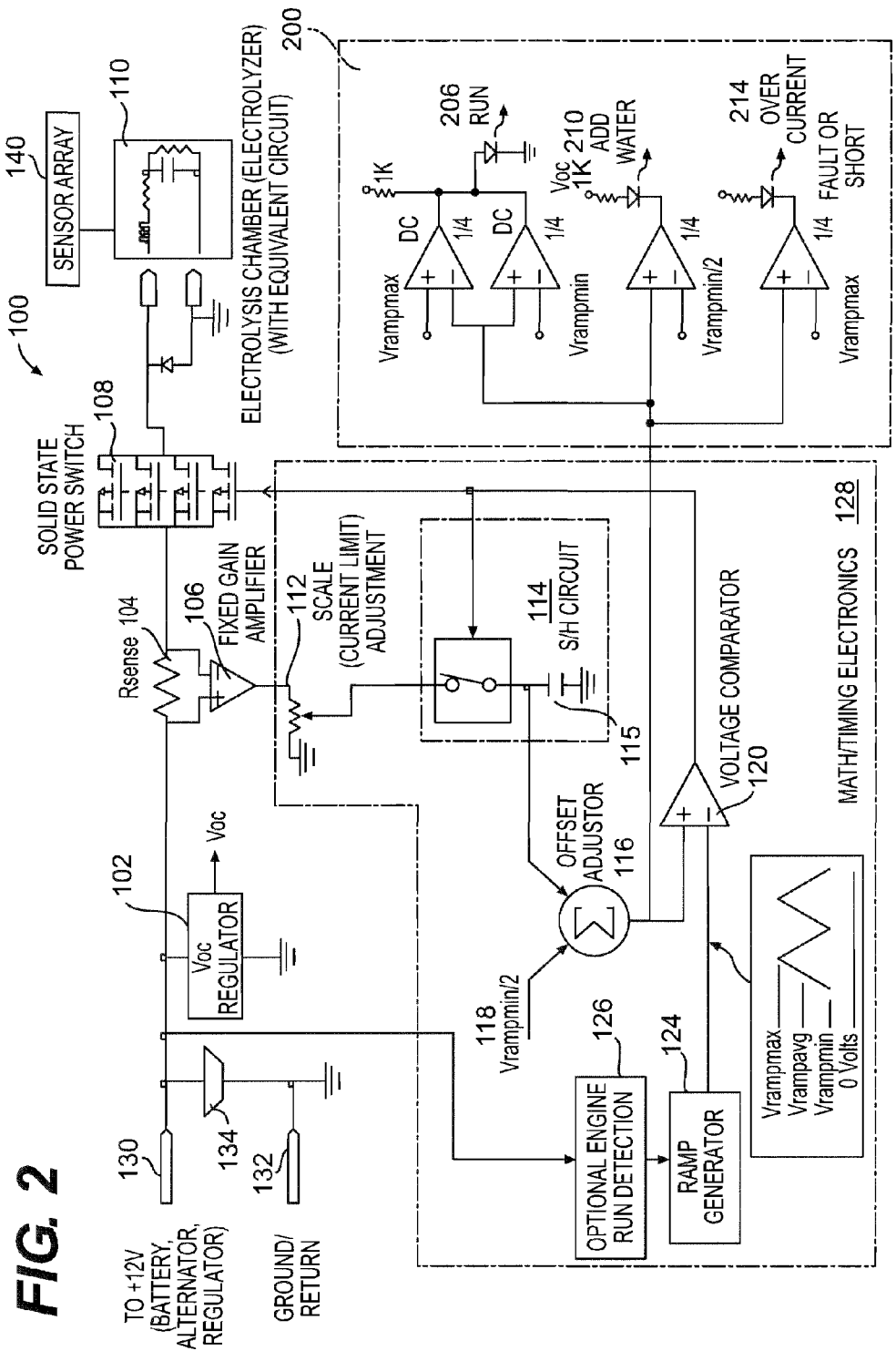
FIG. 2 illustrates an exemplary circuit showing an added circuit to indicate various chamber states.

In another embodiment, the existing processor, an additional processor or even an analog circuit can be added to indicate various chamber states or warnings to a user. For example, FIG. 2 illustrates an exemplary circuit showing an added circuit 200 to indicate chamber states of "Add Water" 210, "Over-Current, Fault or Short" 214, and "Run" 206. An LM339 circuit or equivalent may be used in such an embodiment to indicate chamber states. Specifically, with respect to the chamber state of "Add Water" 210, if the current is detected as consistently low, a lack of sufficient water can be concluded and indicated to a user or computer. With respect to the chamber state of "Over-Current, Fault or Short" 214, if the detected value is consistently high, an over-heat or short-circuit condition, possibly caused by impurities or damage, may be indicated. With respect to the chamber state of "Run" 206, a thermal sensor, gas sensor(s) or gas leak detection system may be added. These sensors or systems provide output signals which may be applied (through one or more processors or circuits) to adjust the signal modulation accordingly or to seize gas generation completely.

Other parameters, such as temperature, pressure, and volume of gas production, can be sensed, monitored or measured. Signals containing information on these parameters may be transmitted or provided to a computer, processor and/or audio or visual output devices. This information is helpful to operators of vehicles or systems employing the technology. By adjusting the signal modulation, a water electrolyze system may be controlled to suit desired gas generation, temperature, pressure, power use or other parameters. Various other circuits and configurations can be used to achieve the desired results of regulating power to the electrolysis chamber.

Figure 3:
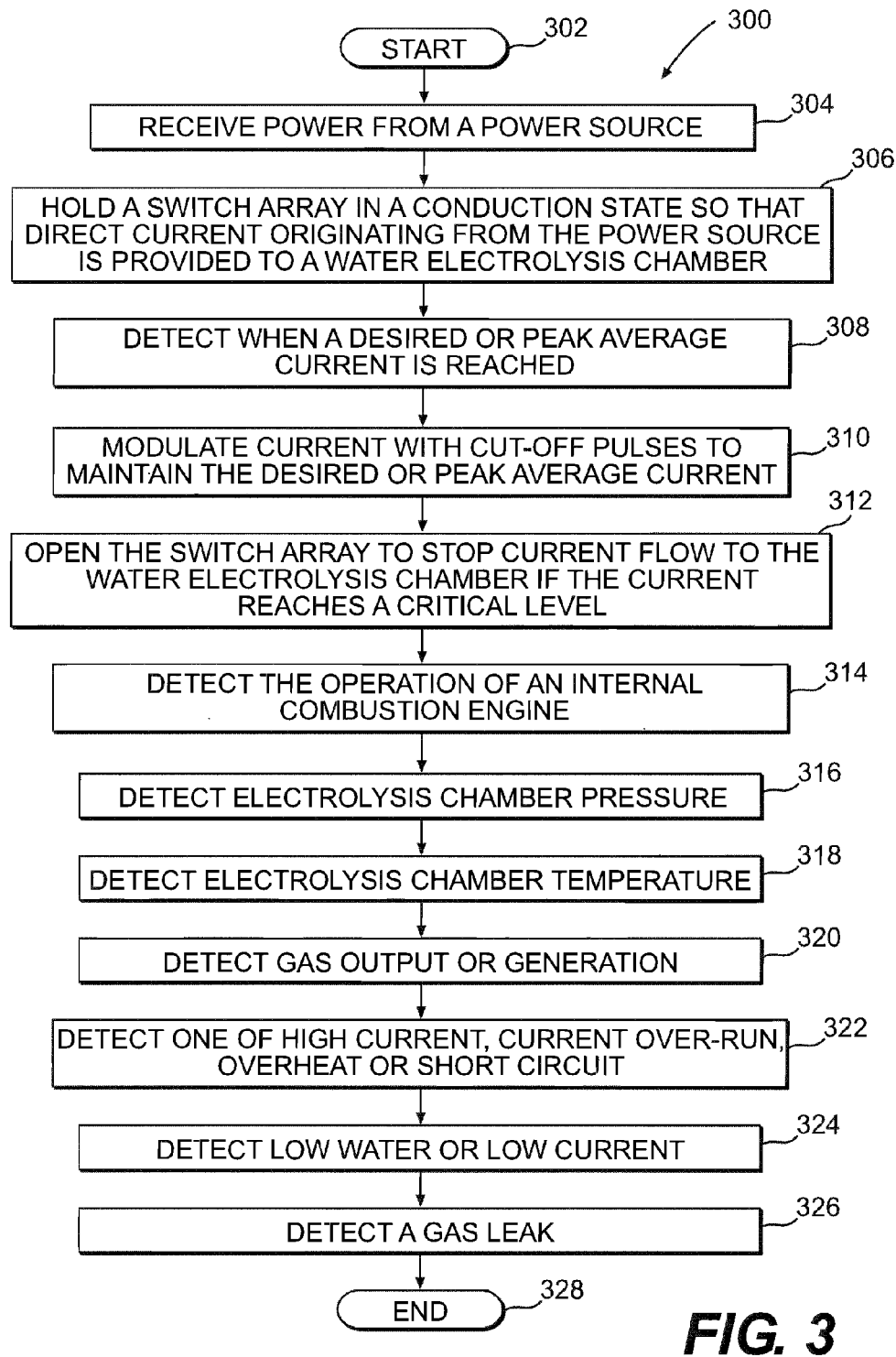
FIG. 3 is a flow chart illustrating an embodiment of a method for providing a current regulating device that controls or regulates the current provided to an electrolysis chamber that produces hydrogen and/or other gases to be burned in an internal combustion engine.

FIG. 3 is a flow chart illustrating an embodiment of a method 300 for providing a current regulating device that controls or regulates the current provided to electrolysis chambers that produce hydrogen and/or other gases to be burned in an internal combustion engine or used in other systems. The method 300 starts (block 302) by receiving power from a power source (block 304). The method 300 holds a switch array in a conduction state so that direct current originating from the power source is provided to a water electrolysis chamber (block 306). The method 300 then detects when a desired current level, for example, peak average current, is reached (block 308). After detecting the desired or peak average current, the method 300 modulates current with cut-off pulses to maintain the desired or peak average current (310). The method 300 opens the switch array to stop current flow to the water electrolysis chamber if the current reaches a critical level, for example, if a peak current is greater than twice the desired or peak average current (block 312). The method 300 may detect the operation of an internal combustion engine (block 314), detect electrolysis chamber pressure (block 316), detect electrolysis chamber temperature (block 318), detect gas output or generation (block 320), detect one of high current, current over-run, overheat or short circuit (block 322), detect low water or low current (block 324), and detect gas leaks (block 326). The method 300 ends at block 328.

Referring to FIG. 3, various combinations of the method steps of method 300 may be used, all may be used, and additional steps may be added.

Figure 4:
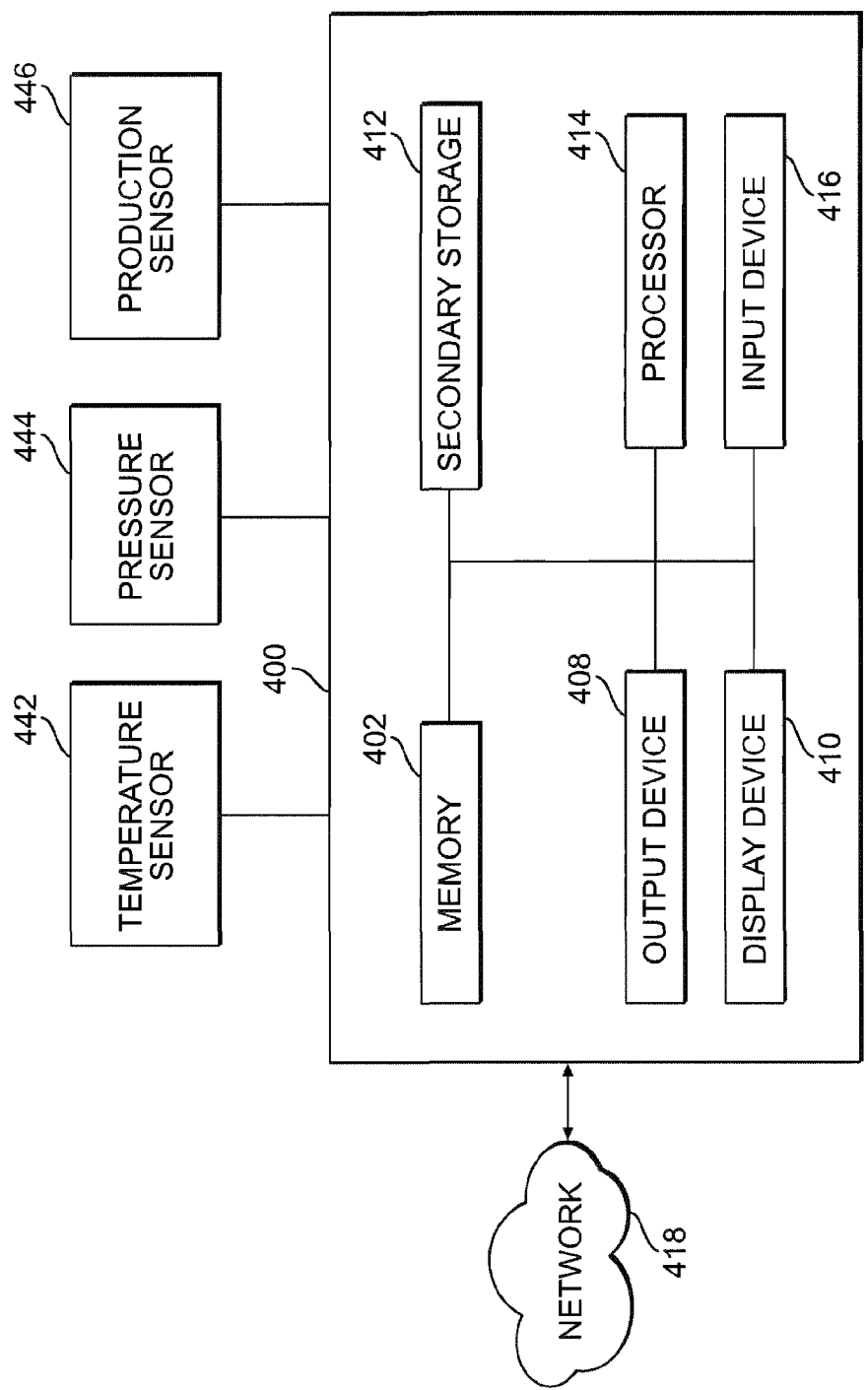
FIG. 4 illustrates exemplary hardware components of a computer or computing device that may be used in connection with or as the system and method for providing a current regulating device that controls or regulates the current provided to electrolysis chambers.

FIG. 4 illustrates exemplary hardware components of a computer or computing device 400 that may be used in connection with the system and method for providing a current regulating device that controls or regulates the current provided to electrolysis chambers. The computer 400 may be a personal computer (PC), a hand-held device, or servers, and may include a connection with a network 408, such as the Internet or other type of computer network. The computer 400 typically includes a memory 402, a secondary storage device 412, a processor 414, an input device 416, a display device 410, and an output device 408. The computer 400 may be monitored remotely.

The memory 402 may include random access memory (RAM) or similar types of memory. The secondary storage device 412 may include a hard disk drive, floppy disk drive, CD-ROM drive, or other types of non-volatile data storage, and may correspond with various databases or other resources.

The processor 414 may execute programs using data stored in the memory 402, the secondary storage 412, or received from the Internet or other network 408, to perform methods and functions described herein. For example, the processor 414 may be used to control the timing of the bank of solid state power switches 108 and to do so with respect to the signal measured after the fixed gain current amplifier 106. In an embodiment, the S/H circuit 114 may be built into the processor 414. One of ordinary skill understands that most, if not all parts, of the current regulator or controller described can be implemented in hardware or in software. A single processor such as the PIC12C508 from Microchip can be used. Various portions of the current regulating device can be implemented in software mixed with portions in hardwired circuitry. All such combinations are included herein.

The input device 416 may include any device for entering data into the computer 400, such as a keyboard, keypad, cursor-control device, touch-screen (possibly with a stylus), or microphone. The display device 410 may include any type of device for presenting a visual image, such as, for example, a computer monitor, flat-screen display, or display panel. The output device 408 may include any type of device for presenting data in hard copy format, such as a printer, or other types of output devices including speakers or any device for providing data in audio form. The computer 400 can possibly include multiple input devices, output devices, and display devices. Various sensor information, for example, pressure, temperature, and gas output, obtained from a temperature sensor 442, a pressure sensor 444, and a production sensor 446, respectively, may be provided to the computer device 400.

Although the computer 400 is shown with various components, one skilled in the art will appreciate that the computer 400 can contain additional or different components. In addition, although aspects of an implementation consistent with the method for providing a current regulating device that controls or regulates the current provided to electrolysis chambers are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 400 to perform a particular method, such as methods described herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for controlling the production of gas by a water electrolysis chamber using pulsed DC current comprising:
    a water electrolysis chamber;
    a power supply;
    an array of solid state power switches operably connected between the power supply and the water electrolysis chamber through a monitoring resistor, the voltage across the monitoring resistor being proportional to current flowing from the power supply to the electrolysis chamber;
    a first connection configured to supply the voltage across the monitoring resistor through a sample/hold circuit comprising a capacitor to an offset adjustor;
    a ramp generator adapted to generate a ramp voltage varying between a minimum voltage, $V_{rampmin}$, and a maximum voltage, $V_{rampmax}$;
    a second connection to supply voltage to the offset adjustor configured to supply a reference voltage to the offset adjustor, the offset adjustor being configured to combine the voltage from the sample/hold circuit and the voltage from the second connection;
    a third connection from the ramp generator to a first input of a voltage comparator;
    a fourth connection configured to supply the combined voltage from the offset adjustor to a second input of the voltage comparator; and
    a fifth connection from the voltage comparator to the array of solid state power switches, whereby the power switches supply pulsed DC current to the electrolysis chamber and maintain the pulsed DC current at or below a desired current magnitude.

2. The system of claim 1, wherein the array of solid state power switches comprise semiconductor switches.

3. The system of claim 1, wherein the array of solid state power switches comprise a bank of Metal Oxide Semiconductor Field Effect Transistors (MOSFET) switches.

4. The system of claim 1, further comprising:
    a temperature sensor for receiving temperature information from the water electrolysis chamber; and
    a detector, wherein an internal combustion engine is detected as operating.

5. The system of claim 1, further comprising a circuit to detect an over-current chamber condition.

6. The system of claim 1, further comprising a circuit to detect an add water chamber condition.

7. The system of claim 1, further comprising a circuit to detect a gas leak chamber condition.

8. The system of claim 1, further comprising:
    a pressure sensor for sensing pressure in the electrolysis chamber; and
    a temperature sensor for sensing temperature in the electrolysis chamber.

9. The system of claim 1, further comprising:
    a sensor that monitors volume of gas production.

10. The system of claim 1, further comprising:
    means for receiving temperature information from the water electrolysis chamber; and
    means for detecting that an internal combustion engine is on.

11. The system of claim 1, further comprising:
    a pressure sensor for sensing pressure in the electrolysis chamber; and a temperature sensor for sensing temperature in the electrolysis chamber.

12. The system of claim 1 further comprising:
a temperature sensor for sensing temperature in the electrolysis chamber;
wherein the pulsed DC current provided to the electrolysis chamber through the array of solid state power switches is regulated using the sensed temperature.

13. The system of claim 1 further comprising:
a pressure sensor for sensing pressure in the electrolysis chamber;
wherein the pulsed DC current provided to the electrolysis chamber through the array of solid state power switches is regulated using the sensed pressure.

14. The system of claim 1 further comprising:
a sensor that monitors volume of gas production in the electrolysis chamber;
wherein the pulsed DC current provided to the electrolysis chamber through the array of solid state power switches is regulated using the sensed volume of gas.

15. The system of claim 1, further comprising:
the first connection further comprising supplying the voltage across the monitoring resistor through a fixed gain current amplifier, then through a scale adjustment resistor, and then through the sample/hold circuit;
a sixth connection from a Vcc regulator to the monitoring resistor; and
a seventh connection from an engine run detector to the ramp generator.

16. The system of claim 15 further comprising:
a temperature sensor for sensing temperature in the electrolysis chamber;
wherein the pulsed DC current provided to the electrolysis chamber through the array of solid state power switches is regulated using the sensed temperature.

17. The system of claim 15 further comprising:
a pressure sensor for sensing pressure in the electrolysis chamber;
wherein the pulsed DC current provided to the electrolysis chamber through the array of solid state power switches is regulated using the sensed pressure.

18. The system of claim 15 further comprising:
a sensor that monitors volume of gas production in the electrolysis chamber;
wherein the pulsed DC current provided to the electrolysis chamber through the array of solid state power switches is regulated using the sensed volume of gas.

* * * * *